Patented Jan. 26, 1943

2,309,176

UNITED STATES PATENT OFFICE 2,309,176

COLORATION OF MATERIALS MADE OF OR CONTAINING CELLULOSE DERIVATIVES

Henry Dreyfus, London, England, assignor to Celanese Corporation of America, a corporation of Delaware No Drawing. Application October 1, 1938, Serial No. 232,796. In Great Britain October 19, 1937

17 Claims. (Cl. 8—40)

This invention relates to the manufacture of new dyestuffs and to the coloration of materials with such dyestuffs.

It has been discovered that the presence in dyestuffs of a hydroxyalkyl group esterified with an organic acid, especially together with a hydroxyalkyl group which is not substituted by an organic radicle, tends to enhance the affinity of the dyestuffs for cellulose ester and ether materials, and the present invention includes the manufacture of dyestuffs containing such groups, the dyestuffs themselves, compositions of matter containing the new dyestuffs, the coloration of materials with the new dyestuffs and the colored materials so obtained.

The dyestuffs of the greatest importance in connection with this invention are dyestuffs of the azo series and the anthraquinone series and nitro dyestuffs which contain two or more aryl nuclei linked together directly, as in diphenyl and similar diaryl compounds, or indirectly, e. g. through an oxygen atom, a sulphur atom or an —NH—, —CH$_2$—, —CO— or —CO—NH— group. In the case of azo dyestuffs, the dyestuffs should contain a hydroxy group attached to an alkyl radicle in addition to an esterified hydroxy group attached to an alkyl radicle, and it is preferable in the case of dyestuffs of other series that both types of groups should be present. Dyestuffs which contain hydroxalkyl groups may be converted, if desired, to the corresponding sulphato-alkyl compounds and used in that form for dyeing.

Hydroxyalkyl and esterified hydroxyalkyl groups may be linked to the dyestuff nuclei through suitable atoms or groups, particularly through nitrogen, oxygen or sulphur atoms. The dyestuffs of the present invention may contain more than one esterified hydroxyalkyl group and more than one hydroxyalkyl group.

The dyestuffs may be made in various ways. Thus, dyestuffs which contain hydroxyalkyl groups may be treated so as to esterify such groups, for example by reacting the dyestuffs with organic acid esterifying agents, e. g., organic acids, acid anhydrides or acid chlorides. Again, a dyestuff which contains a primary or secondary amino group, a hydroxy group or a mercaptan group may be reacted with a reagent containing a reactive halogen atom and a hydroxyalkyl group esterified with an organic acid radicle. Thus, a dyestuff containing a primary or secondary amino group may be treated under weakly alkaline conditions with an ω-halogen alkyl ester, e. g., β-chlorethyl acetate.

Another method which may be employed for the production of the dyestuffs consists in the esterification of a dyestuff containing a carboxylic acid or carboxylic acid halide group with a compound containing a hydroxy group and an esterified hydroxyalkyl group, e. g., glycol monoacetate.

In the case of the azo dyestuffs, as indicated above, the dyestuffs should contain both a hydroxy group attached to an alkyl radicle and an esterified hydroxy group attached to an alkyl radicle. Thus, an azo dyestuff containing two hydroxyalkyl groups may be treated so as to esterify only one of such groups, e. g., by effecting the esterification under controlled conditions. Or, again, azo dyestuffs containing primary or secondary amino groups, hydroxy groups or mercaptan groups may be reacted simultaneously or successively with reagents containing reactive halogen atoms and esterified hydroxyalkyl groups and with hydroxyalkylating agents, e. g., ethylene chlorhydrin, glycerine chlorhydrin, epichlorhydrin or an alkylene oxide, e. g., ethylene oxide. Suitable azo dyes may be obtained by diazotising aniline, the toluidines, the anisidines, the phenetidines and their nitro and halogen derivatives and coupling the diazo compounds obtained with coupling components, the diazo compounds and the coupling components being so selected that the azo dyes produced contain the required primary or secondary amino groups, hydroxy groups or mercaptan groups.

Similar considerations apply in the case of nitro dyestuffs containing two or more aryl nuclei linked together. The new dyestuffs may be prepared by the esterification of a dyestuff of the series in question which contains a hydroxy alkyl group or by the partial or complete esterification of a dyestuff of the series which contains more than one hydroxylalkyl group; or the dyestuffs may be prepared by the reaction of a dyestuff of the series which contains a primary or secondary amino group, a hydroxy group or a mercaptan group with a suitable halogenated reagent as described above, a hydroxyalkyl group being introduced previously, simultaneously or subsequently, if desired.

The dyestuffs of the anthraquinone series containing esterified hydroxyalkyl groups and, if desired, hydroxyalkyl groups, may be prepared by the general methods indicated above. Such dyestuffs will contain auxochrome groups, e. g., nuclear amino, hydroxy or mercaptan groups, additional to the esterified hydroxyalkyl groups which are characteristic of the present invention.

Thus the anthraquinone dyestuffs may be obtained by reacting an anthraquinone compound containing a primary or secondary amino group, a hydroxy group or a mercaptan group with a reagent containing an esterified hydroxyalkyl group and a reactive halogen atom. For example an amino anthraquinone may be reacted with chlorethyl acetate.

The anthraquinone dyestuffs according to this invention preferably contain an amino group in the 1-position and preferably contain also an amino or hydroxy group in the 4-position, and such groups may themselves be substituted by esterified hydroxyalkyl groups, as, for example, in 1-acetoxyethylamino-4-amino-anthraquinone, (produced by reacting 1:4-diamino-anthraquinone with the calculated quantity of chlorethyl acetate in the presence of sodium acetate), or by alkyl, hydroxyalkyl or aryl groups. If the esterified hydroxyalkyl groups in these dyestuffs are not attached at the 1- and/or 4-positions they are preferably in the 2- and/or 3-positions.

Another series of anthraquinone dyestuffs according to the present invention are those obtained by introducing esterified hydroxyalkyl groups into amino anthraquinones containing cycloaliphatically substituted carboxylic acid amide groups. Such compounds, even when not containing esterified hydroxyalkyl groups, are dyestuffs for cellulose ester and other materials. An example of such a compound is 1:4-diamino-anthraquinone-2-carboxylic acid cyclohexylamide, obtained by treating 1-amino-4-bromanthraquinone-2-carboxylic acid cyclohexylamide with excess of ammonia at 120° C. It may be converted into a dyestuff according to the present invention by reaction with chlorethyl acetate in the presence of sodium acetate.

The dyestuffs may also be obtained from components which contain esterified hydroxyalkyl groups with or without hydroxyalkyl groups. Thus azo dyestuffs may be produced from components which together contain a hydroxyalkyl group and an esterified hydroxyalkyl group so that both these groups are present in the final dyestuff. Such groups may each be present in the diazo compound or in the coupling component, or one of such groups may be present in the diazo compound and the other in the coupling component. Thus, for example, azo dyestuffs in accordance with this invention may be obtained by diazotising any of the amines set forth above with reference to azo dyestuffs and coupling the diazo compounds obtained with N.acetoxyethyl N.hydroxyethyl aniline (prepared as described in Example 1) or other coupling component containing an esterified oxyalkylamino group.

Again, nitro dyestuffs containing two aryl nuclei linked through a nitrogen atom may be synthesised by reacting a nitro-aryl compound containing a halogen atom with an aryl compound containing a primary or secondary amino group so as to eliminate said halogen atom and said hydrogen atom, at least one of the aryl compounds containing an esterified hydroxyalkyl group. For example, 2:4-dinitro-1-chlorbenzene may be reacted with 1-amino-4-N.acetoxyethylamino-benzene (produced by reacting p-nitraniline with ethylene chlorhydrin in the presence of a basic substance, acetylating the product by refluxing it in glacial acetic acid with the calculated quantity of acetic anhydride, and then reducing the nitro group) in the presence of sodium acetate so as to form 2:4-dinitro-4'-acetoxyethylamino-diphenylamine.

Nitro dyestuffs containing two aryl nuclei linked by a —CO—NH— group may be obtained by reacting an aromatic compound containing a carboxylic acid or carboxylic acid halide group with an aromatic compound containing a primary amino group, the components containing between them a nitro group and an esterified hydroxyalkyl group. For example p-aminobenzoic acid may be oxyalkylated with ethylene chlorhydrin and acetylated with acetic anhydride and the product then condensed with o-nitraniline.

Other methods of obtaining the dyestuffs are available. Thus, instead of esterifying a dyestuff containing a hydroxyalkyl group with an organic acid, acid anhydride or acid chloride, a dyestuff containing a halogenated alkyl group may be reacted with a suitable metal salt of an organic acid. Again, instead of reacting dyestuffs containing primary or secondary amino groups, hydroxy groups or mercaptan groups with reagents containing reactive halogen atoms and esterified hydroxyalkyl groups, the reactive halogen atoms may be present in the dyestuffs and the reagents may contain the primary or secondary amino groups, hydroxy groups or mercaptan groups. For example, a dyestuff containing a halogen atom may be treated under weakly alkaline conditions with an ω-amino-alkyl ester, for example β-amino-ethyl acetate, or with an ester of a hydroxyalkyl mercaptan, for example the acetate of hydroxyethyl mercaptan obtained by the acetylation of hydroxyethyl mercaptan with acetic anhydride.

Another method for the production of nitro dyestuffs containing two or more aryl nuclei linked through a nitrogen atom consists in reacting an aryl compound containing a halogen atom with a nitroaryl compound containing a primary or secondary amino group, at least one of the aryl compounds containing an esterified hydroxyalkyl group. For example 4-bromaniline may be oxyalkylated with ethylene chlorhydrin and then acetylated with acetic anhydride and the product reacted with p-nitraniline in the presence of potassium carbonate and cuprous iodide.

The introduction of hydroxyethyl groups may in general be effected by the method described above in relation to azo dyestuffs. Another method consists in reacting a compound containing a halogen atom with an amino alcohol, e. g., an ethanolamine.

As indicated above, the dyestuffs may be sulphated so as to convert any hydroxyalkyl groups present therein into sulphato-alkyl groups and this sulphation step may be effected at any stage in the manufacture of the dyestuffs. The sulphation may be effected, for example, by treatment with strong sulphuric acid.

Whilst reference has been made above only to acetic esters of the hydroxyalkyl compounds, esters of other organic acids may be formed. The invention is of greatest importance in connection with esters of aliphatic acids and particularly esters of the lower fatty acids, e. g. acetic acid, propionic acid and butyric acid. The alkyl group of the esterified hydroxyalkyl group may be, for example, an ethyl, propyl or butyl group.

As stated above, the dyestuffs produced according to this invention have valuable dyeing properties for cellulose ether and ester materials. They are of the greatest importance in the coloration of cellulose acetate materials, but as examples of other esters and ethers of cellulose which may be colored by means of them, reference may be made to cellulose formate, propionate and butyrate and to the ethyl, butyl and benzyl ethers of cellulose. The new dyestuffs may also be employed in the coloration of mixed materials comprising one or more of the aforesaid cellulose esters or ethers in admixture with other textile fibres, for example, wool, silk or other animal fibres, or cotton, regenerated cellulose or other cellulosic materials. Such other fibres may be colored by the same dyestuffs as the cellulose esters and ethers when they possess the requisite affinity, or they may be colored either in the same or different shades by means of other dyestuffs either before, after or simultaneously with the coloration of the cellulose esters or ethers.

The new dyestuffs may be applied to textile materials in solution where they are sufficiently soluble, in aqueous suspension or after being brought into colloidal form, and it is to be understood that the invention includes dyeing compositions which contain the dyestuffs in conjunction with dispersing agents and/or protective colloids.

The new dyestuffs may be applied to the materials from an aqueous bath or may be printed or stenciled on to the materials.

The following examples illustrate the invention but are not to be regarded as limiting it in any way:

Example 1

138 parts of powdered p-nitraniline are stirred with about 3000 parts of water and 250 parts of concentrated hydrochloric acid and the mixture is then diazotised in the usual manner with 69 parts of sodium nitrite. Sodium acetate is added to the diazo solution to neutralise the mineral acid and the solution is then mixed with a solution of 223 parts of N.acetoxyethyl-N.hydroxyethyl aniline in dilute hydrochloric acid and the mixture is stirred until the formation of the dyestuff is completed. The dyestuff is then filtered off and washed. The coupling component employed may be prepared by boiling mono-N.hydroxyethyl aniline with $\beta$-chlorethyl acetate in the presence of sodium acetate.

Example 2

The dyestuff described in the previous example is prepared by coupling diazotised p-nitraniline with hydroxyethyl aniline and then boiling the azo compound obtained with $\beta$-chlorethyl acetate in the presence of sodium acetate.

Example 3

An anthraquinone dyestuff containing an acetoxyethylamino grouping is obtained by refluxing finely divided 1-hydroxyethylamino-4-phenylamino-anthraquinone with the calculated quantity of acetic anhydride in glacial acetic acid for about 1–2 hours.

Example 4

A dyestuff similar to that of Example 3 is obtained by refluxing about 20 parts by weight of 1-amino-4-phenylamino-anthraquinone, 10 parts of sodium acetate and 100 parts of ethylene chlorhydrin for about 6–10 hours.

Example 5

An anthraquinone dyestuff containing free hydroxy-ethyl groups and acetoxy-ethyl groups is obtained in the following manner. 1-brom-4-amino-anthraquinone is reacted with monoethanolamine to form 1-amino-4-oxyethylamino anthraquinone. This is then reacted with chlorethyl acetate in the presence of sodium acetate forming 1-acetoxy-ethyl-amino 4-oxyethyl-amino-anthraquinone.

Example 6

250 parts of 2-nitro-4'-acetylamino-diphenylamine are heated in the presence of about 350 parts of chlorobenzene with 50 parts of ethylene oxide at a temperature of 130–150° C. for 3–5 hours. The chlorobenzene and any excess ethylene oxide is then driven off, and the acetyl group split off by treatment with 10% alcoholic caustic soda solution. The product is then separated and refluxed with chlorethyl acetate in the presence of sodium acetate. A dyestuff containing an esterified oxyalkyl group and a free oxyalkyl group is then obtained.

Example 7

2:4-dinitro-4'-amino-diphenylamine is refluxed with chlorethyl acetate in the presence of sodium acetate, and a diphenylamine dyestuff is thus obtained containing an acetoxyethyl group.

Dyestuffs according to the invention containing two or more aryl nuclei linked together either directly or through an oxygen or sulphur atom or a —CH$_2$—, —CO—, or —CONH— group may be obtained in a manner similar to that described in Example 7 from a suitable diaryl or polyaryl dyestuff containing one or more primary or secondary amino groups.

Fabrics and other materials containing organic derivatives of cellulose may be colored with any of the above dyestuffs applied, for example, as aqueous dispersions by dyeing, printing, or other methods.

Having described my invention, what I desire to secure by Letters Patent is:

1. Dyestuffs containing both a hydroxyalkyl group and a hydroxyalkyl radicle esterified with an organic acid radicle.

2. Azo dyestuffs containing both a hydroxyalkyl group and a hydroxyalkyl radicle esterified with an organic acid radicle.

3. Azo dyestuffs containing both a hydroxyalkyl group and an acetoxyethyl group.

4. Anthraquinone dyestuffs containing both a hydroxyalkyl group and a hydroxyalkyl radicle esterified with an organic acid radicle.

5. Dyestuffs containing at least two aryl nuclei, a nitro group, a hydroxyalkyl group and a hydroxyalkyl radicle esterified with an organic acid radicle.

6. Anthraquinone dyestuffs containing both a hydroxyalkyl group and an acetoxyethyl group.

7. Anthraquinone dyestuffs containing both a hydroxyalkyl group and an N-acetoxyethyl group.

8. Diphenylamine dyestuffs containing a nitro group, a hydroxyalkyl group and an acetoxyethyl group.

9. Diphenylamine dyestuffs containing a nitro group, a hydroxyalkyl group and an N-acetoxyethyl group.

10. Process for the coloration of materials, which comprises coloring said materials with dyestuffs containing both a hydroxyalkyl group and a hydroxyalkyl radicle esterified with an organic acid radicle.

11. Process for the coloration of textile materials containing organic derivatives of cellulose, which comprises coloring said textile materials with dyestuffs containing both a hydroxyalkyl group and a hydroxyalkyl radicle esterified with an organic acid radicle.

12. Process for the coloration of textile materials containing organic derivatives of cellulose, which comprises coloring said textile materials with azo dyestuffs containing both a hydroxyalkyl group and a hydroxyalkyl radicle esterified with an organic acid radicle.

13. Process for the coloration of textile materials containing cellulose acetate, which comprises coloring said materials with azo dyestuffs containing both a hydroxyalkyl group and an acetoxyethyl group.

14. Process for the coloration of textile materials containing organic derivatives of cellulose, which comprises coloring said textile materials with anthraquinone dyestuffs containing both a hydroxyalkyl group and a hydroxyalkyl radicle esterified with an organic acid radicle.

15. Process for the coloration of textile materials containing cellulose acetate, which comprises coloring said textile materials with anthraquinone dyestuffs containing both a hydroxyalkyl radicle and an acetoxyethyl radicle.

16. Process for the coloration of textile materials containing organic derivatives of cellulose, which comprises coloring said textile materials with dyestuffs containing at least two aryl nuclei, a nitro group, a hydroxyalkyl group and a hydroxyalkyl radicle esterified with an organic acid radicle.

17. Process for the coloration of textile materials containing cellulose acetate, which comprises coloring said textile materials with diphenylamine dyestuffs containing a nitro group, a hydroxyalkyl group and an acetoxyethyl group.

HENRY DREYFUS.

CERTIFICATE OF CORRECTION.

Patent No. 2,309,176.  January 26, 1943.

HENRY DREYFUS.

It is hereby certified that error appears in the printed specification of the above numbered patent requiring correction as follows: Page 2, first column, line 30, for "other" read --ether--; and that the said Letters Patent should be read with this correction therein that the same may conform to the record of the case in the Patent Office.

Signed and sealed this 2nd day of March, A. D. 1943.

(Seal)
Henry Van Arsdale,
Acting Commissioner of Patents.